United States Patent

[11] 3,584,977

| [72] | Inventors | William Harold Coleman, II<br>Chadds Ford, Pa.;<br>Bernard Landaff Matthews, Wilmington,<br>Del.; Robert Bolton Mercer, Martinsville,<br>Va. |
|---|---|---|
| [21] | Appl. No. | 816,996 |
| [22] | Filed | Apr. 17, 1969 |
| [45] | Patented | June 15, 1971 |
| [73] | Assignee | E. I. du Pont de Nemours and Company<br>Wilmington, Del. |

[54] PROCESS FOR METERING LIQUID THROUGH SERIALLY CONNECTED PUMPS
3 Claims, 1 Drawing Fig.

[52] U.S. Cl. .................................................. 417/53,
417/19, 417/44, 417/2
[51] Int. Cl. .................................................. I04b 41/06,
I04b 49/00, I04b 49/06
[50] Field of Search ......................................... 417/2, 15,
19, 44, 53

[56] References Cited
UNITED STATES PATENTS

| 1,825,661 | 10/1931 | Gull.............................. | 417/252 |
| 1,140,065 | 5/1915 | Rateau ......................... | 417/2 |
| 1,977,737 | 10/1934 | Needham ..................... | 417/19 |
| 2,543,941 | 3/1951 | Sargent ........................ | 169/15 |
| 2,690,127 | 9/1954 | Sinclair ........................ | 60/52 |
| 3,029,636 | 4/1962 | Mullins, Jr. ................... | 73/187 |
| 3,072,058 | 1/1963 | Christopher et al. ......... | 417/19 |
| 3,439,622 | 4/1969 | Welty et al. .................. | 64/3 |
| 2,837,102 | 6/1958 | Bauer et al. .................. | 172/692 |

*Primary Examiner*—William L. Freeh
*Attorney*—Howard P. West, Jr.

ABSTRACT: A process for metering liquid from a source into a material flowing through a vessel by means of two variable speed gear pumps serially connected between the source and the vessel wherein changes in differential pressure across the second gear pump are used to control the speed of the first gear pump to maintain uniform liquid metering.

PATENTED JUN 15 1971  3,584,977
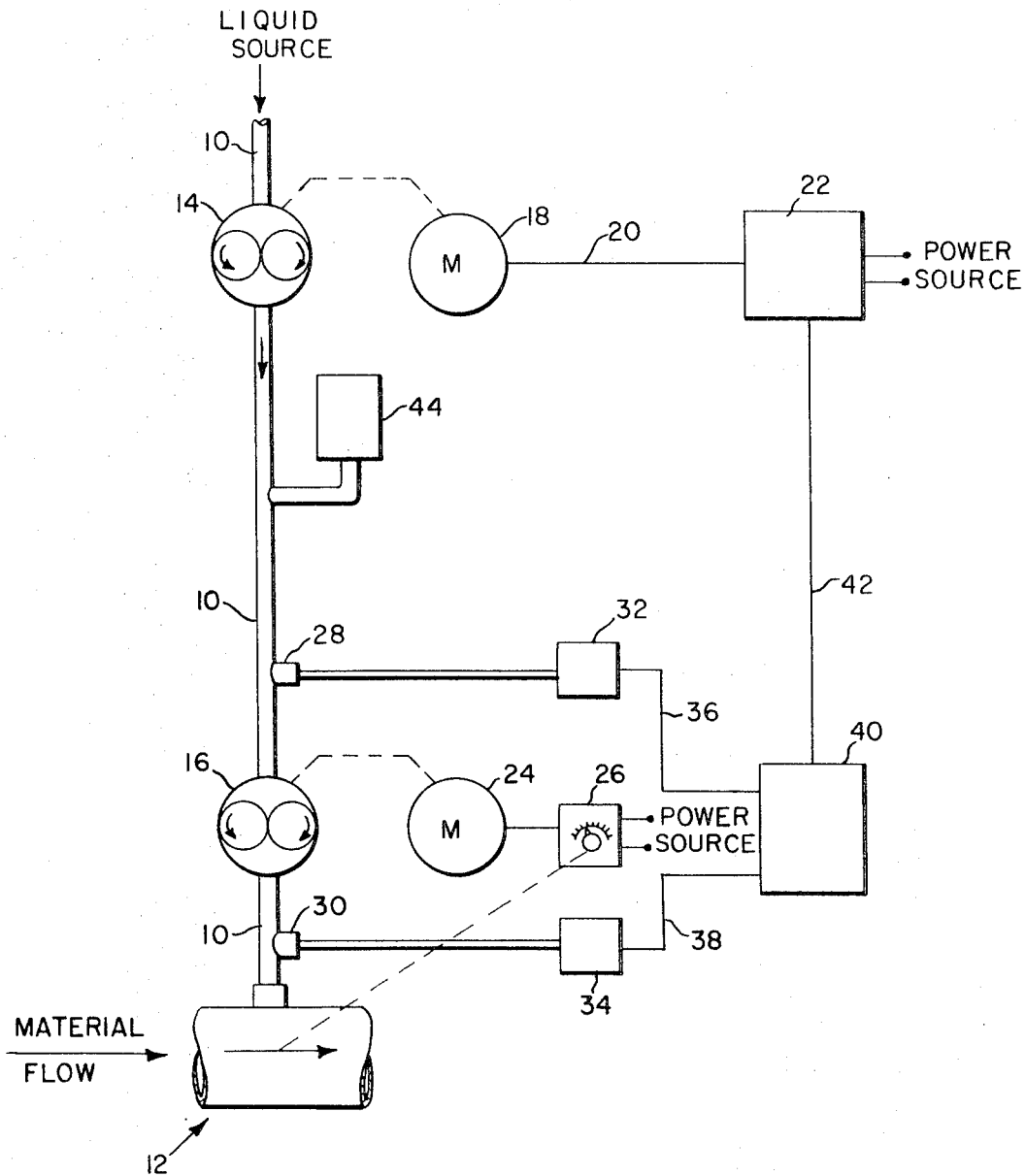
INVENTORS
WILLIAM HAROLD COLEMAN II
BERNARD LANDAFF MATTHEWS
ROBERT BOLTON MERCER
BY *Howard P. West Jr.*
ATTORNEY

3,584,977

PROCESS FOR METERING LIQUID THROUGH SERIALLY CONNECTED PUMPS

BACKGROUND OF THE INVENTION

This invention relates to an improved process for pumping liquids with metering pumps under conditions of high and variable pressure.

The use of gear pumps for pumping liquids at a constant rate is well known. Such pumps are frequently used for the blending of liquids where the relative amounts must be kept constant. One such application is in the production of shaped articles from molten synthetic polymers or polymer solutions where relatively small amounts of additives such as delustrants, dyes and antistatic agents may be incorporated in the polymer by the use of gear-type metering pumps which are used to inject the additive at the required rate into a polymer line or vessel through which the polymer is passed continuously.

When metering pumps are used to add liquids to systems at high pressures, problems arise due to slippage in the metering pump. This problem has been dealt with in prior art apparatus by providing a booster pump, as disclosed in U. S. Pat. Nos. 2,598,307 and 2,837,102. These booster pumps supply the liquid to the inlet of the metering pump at a pressure approximately equivalent to that at the outlet, thus minimizing slippage and improving the accuracy of the pump. In these systems, however, the booster pumps overfeed the liquid to the metering pump at a constant rate and the excess liquid must be bypassed into a return line to the liquid reservoir. Such systems are complicated and somewhat inflexible in operation. Furthermore, unless the output of the booster pump is much higher than that of the metering pump, a considerable increase in back pressure, as may be caused by partial blockage of an injection nozzle, can overcome the capacity of the booster pump to maintain the necessary pressure at the metering pump inlet.

U. S. Pat. No. 3,124,270 discloses a metering pump arrangement in which the metering pump and a booster pump are connected to a common driving motor in such manner that the booster pump runs at a slightly higher speed than the metering pump. While such an arrangement may be useful under conditions of constant pressure, it is obviously not suitable for conditions of high and variable pressure.

SUMMARY OF THE INVENTION

It is an object of this invention to provide an improved process for metering liquids under conditions of high and variable pressure. Another object is to provide a process adapted to meter a liquid at a varying rate proportional to the rate of flow of material to which the liquid is added.

The above objects are accomplished by a process comprising pumping a liquid under pressure through a pipeline from a source to a vessel having a material flowing there through. The liquid is pumped by means of first and second gear pumps serially connected in the pipeline and driven by respective electric motors which have control units for varying their speed. The differential pressure across the second gear pump which does actual metering is continuously detected by means of pressure transducers located upstream and downstream of the second pump the outputs of which are fed to a comparator which subtracts the upstream from the downstream pressure signal and provides an output signal proportional to the differential pressure across the second pump. The output signal is fed to the control unit for the first gear pump motor for changing the speed of the first gear pump motor upon a change in differential pressure across the second gear pump. In this manner the differential pressure across the second gear pump is maintained substantially constant and will enable uniform metering independently of variations in back pressure on the second gear pump.

In one embodiment, the pressure difference is maintained at a level where slippage in the second gear pump, i.e., metering pump is negligible. The level at which the pressure difference must be maintained will, of course, vary depending on such factors as the viscosity of the liquid being pumped, the rate of pumping, etc. In this case, variations in pressure difference within the range where slippage is negligible are not harmful. For example, if slippage becomes negligible at 10 p.s.i. (0.68 atmospheres) pressure differential, then variations in the range of 0—10 p.s.i. (0—0.68 atmospheres) will obviously have little effect on the accuracy of the pumping.

In another embodiment, the pressure difference is maintained substantially constant. In this case, the level at which the pressure difference is held is not particularly critical since any pump slippage will remain relatively constant and the output of the metering pump will thus be constant. Preferably, however, the pressure difference is maintained at a fairly low level to minimize slippage while holding the pressure difference at a fairly constant level. Under the latter conditions the accuracy of the metering pump is not significantly affected by viscosity changes.

The second pump may be operated at constant speed or at variable speed as may be necessary where the rate of flow of material to which the metered liquid is added varies from time to time. In the latter situation, the second or metering pump speed is preferably controlled automatically to provide an output of metered liquid proportional to the varying flow of material to which the liquid is added. The apparatus of this invention is illustrated schematically in the drawing.

Serially connected in pipeline 10 between a liquid source and a vessel 12 through which material flows are first and second gear pumps 14, 16 respectively. The first gear pump 14 which serves as a booster pump is driven by motor 18 the speed of which is controlled by an electrical control unit 22 connected to the motor through lead 20. The control unit 22 is of a conventional type employing silicon-controlled rectifiers which vary the voltage supplied to the motor when actuated by an electrical signal. The second gear pump 16 which serves as a metering pump is driven by motor 24 the speed of which is regulated by control unit 26 which may be coupled to the rate of flow of material through vessel 12 by suitable electrical or mechanical linkages at the material feed inlet to vessel 12. Pressure sensors 28, 30 are connected in pipeline 10 upstream and downstream respectively of pump 16. These may suitably be hydraulic-type sensors consisting of a mercury-filled bulb, a capillary and a Bourdon tube. The hydraulic signals therefrom may be fed to transducers 32 and 34 which convert the hydraulic signals to electrical signals which are in turn fed over leads 36,38 to a suitable comparator 40 which substracts one signal from the other to produce an output signal which is compared with a control signal, the control signal being set to maintain the desired pressure difference across pump 16. If the pressure difference across meter pump 16 varies from the control level, then the output signal and control signal will differ and a correction signal is transmitted over lead 42 to motor control unit 22. The correction signal is transmitted over lead 42 to motor control unit 22. The correction signal then results in an increase or decrease in the speed of motor 18 to bring the pressure difference to the desired level.

Preferably, a pressure accumulator 44 is connected to pipeline 10 between pumps 14 and 16 to minimize the effect of momentary pressure surges which occur in hydraulic systems of this type.

The process and apparatus of this invention has the advantage of operating over a wide range of pressure conditions to provide accurate metering of various liquids. No recirculation of liquid is required, thus eliminating the holding and repeated working of liquids which may be chemically or physically unstable. Elimination of recirculation is particularly desirable with slurries, emulsions, etc. where repeated pumping may cause separation of one phase from the other or otherwise change the character of the dispersion.

The process may be operated with no pressure difference across the metering pump. However, to prevent backlash in the pumps and provide smooth operation of the system, it is desirable that the outlet pressure be somewhat higher than the inlet pressure differences in the range of 5—50 p.s.i. (0.34 — 3.4 atmospheres) being preferred.

EXAMPLE

An antistatic agent, polyethylene oxide having a molecular weight of about 2,000, is continuously added to 66 nylon polymer, which is subsequently extruded to form nylon yarn, by injection into the molten polymer at a point near the inlet of a melting and extruding apparatus of the type described in British Published Specification No.998,063. The polyethylene oxide is supplied to the injection nozzle with an apparatus of the type shown in the drawing. The speed of the metering pump is controlled automatically in relation to the rate at which the nylon flake is fed to the melter-extruder apparatus. The polyethylene oxide is pumped at a rate of 2.40 parts per 100 parts of polymer. The pressure at the outlet of the metering pump is maintained at a level of about 50 p.s.i.(3.4 atmospheres) greater than the inlet pressure by controlling the speed of gear pump 14 appropriately. Over a period of time, the back pressure on the metering pump builds up gradually due to partial blockage of the injection nozzle. The difference in pressure, however, holds at about 50 p.s.i. (3.4 atmospheres). When the back pressure on the metering pump reaches 1,5000 p.s.i. (103 atmospheres), the injection nozzle is removed for cleaning. Although the rate of flake feed to the melter-extruder varies during the run by ±12 percent and the back pressure on the metering pump varies from about 50 p.s.i.g. to 1,500 p.s.i.g. (4.4 to 103 atmospheres), the amount of antistatic agent in the polymer remains substantially constant throughout the run.

What I claim is:

1. In a process for metering liquid from a source into a material flowing through a vessel according to the flow rate of the material through the vessel including the step of pumping the liquid under pressure through a pipe from said source to said vessel through first and second gear pumps serially connected in said pipeline and driven by respective electric motors, said motors having control units for varying the speed thereof, the improvement comprising the steps of;
   a, continuously detecting the differential pressure across the second gear pump;
   b, generating a signal proportional to said differential pressure; and
   c, feeding said signal to the control unit of the first gear pump motor for changing the speed of the first gear pump motor upon a change in differential pressure across the second gear pump whereby the first gear pump changes speed due to a change in back pressure on said second gear pump, said differential pressure thereby being maintained substantially constant.

2. The process according to claim 1, said material flowing through said vessel at a varying rate, and including the additional step of varying the speed of said second pump in proportion to said varying rate.

3. The process according to claim 2, said differential pressure being maintained substantially constant at a level in the range of about 5 to 50 pounds per square inch.